United States Patent Office 2,762,290
Patented Sept. 11, 1956

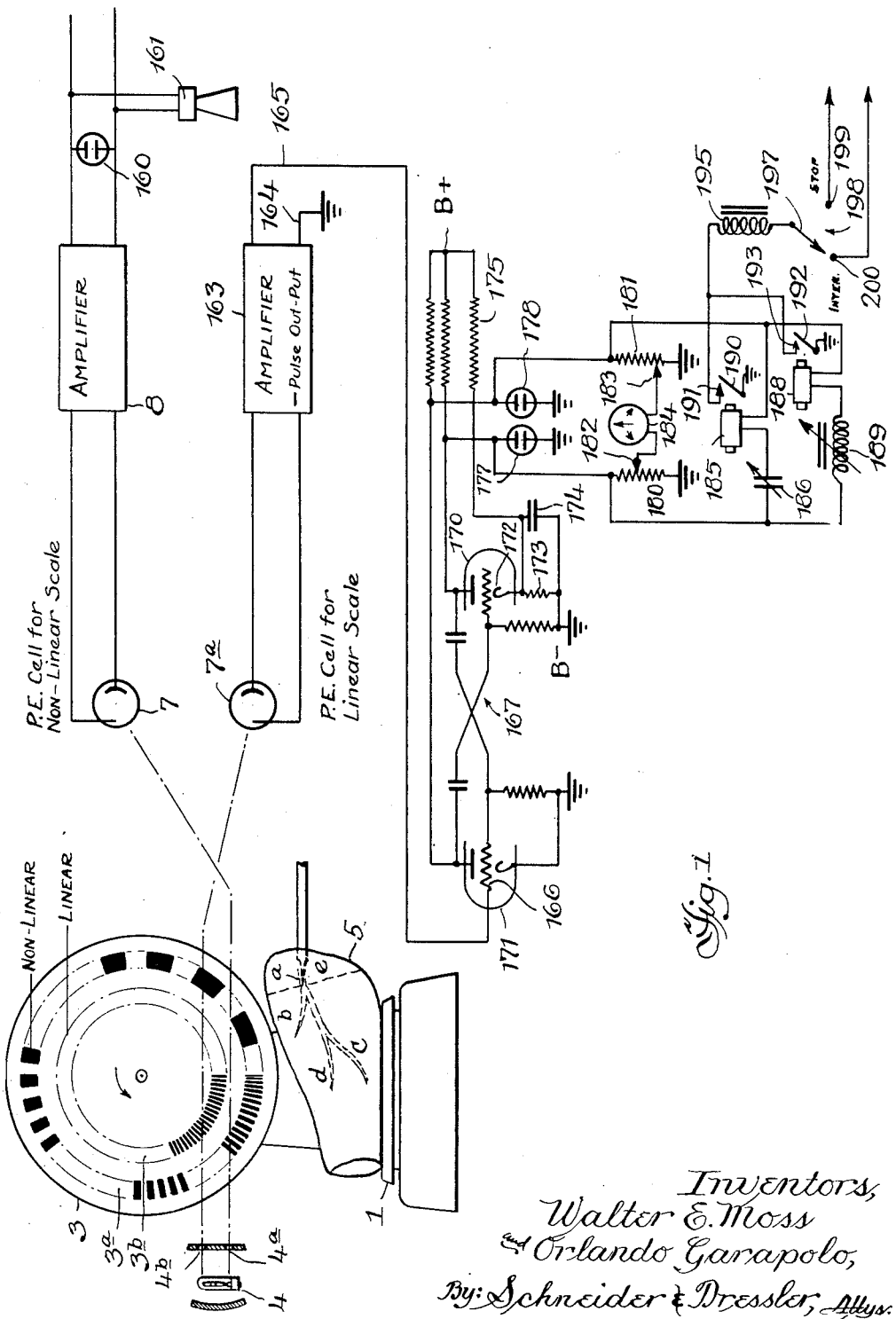

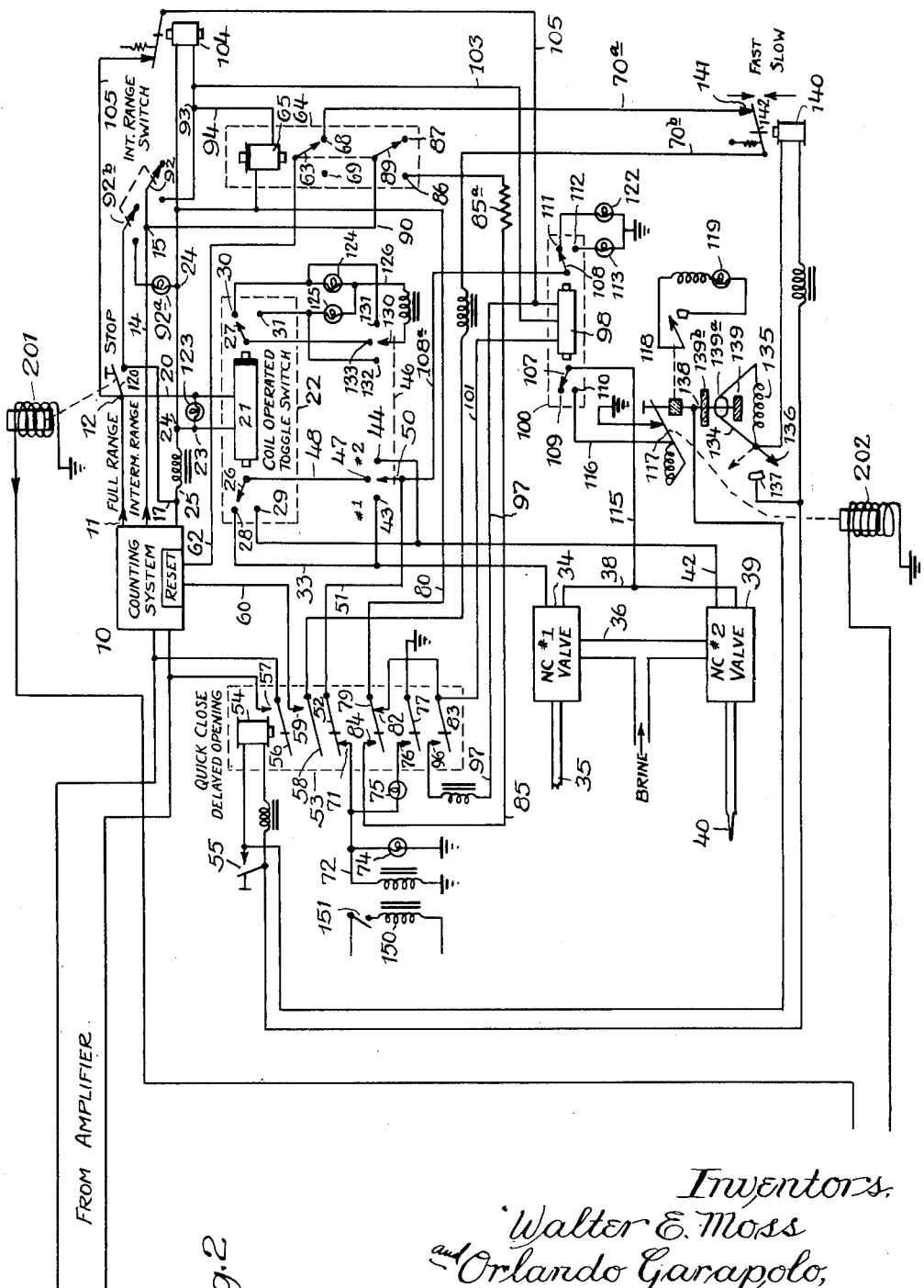

2,762,290

WEIGHING SYSTEM

Walter E. Moss, Brookfield, and Orlando Garapolo, Chicago, Ill., assignors to Wilson & Co., Inc., a corporation of Delaware Application May 3, 1952, Serial No. 285,988

12 Claims. (Cl. 99—256)

This invention relates to a weighing system and is a continuation-in-part of our copending application, Serial No. 149,078 filed March 11, 1950, now Patent No. 2,605,694. In our prior application, we have disclosed and claimed a weighing system wherein articles falling within a predetermined range of weights first have the base weight of the article established and then processed until a weight variation of a predetermined relative magnitude is effected. Specifically, our prior application concerns itself with processing of hams in which each ham is injected with brine or pickling liquor in amount such as to secure a weight increase proportional to the initial or base weight of the particular ham. As is disclosed in said application, that invention is generally applicable to various articles or quantities of material which are to be processed in such a manner as to effect a predetermined percentage of variation in weight.

In the specific example of the treatment of hams, the processing involves the introduction of brine into the vascular system in each ham until the weight of the ham is increased by a desired percentage of the base weight. Due to the fact that individual hams vary in base weight, each processing cycle differs from other processing cycles as regards duration or amount of weight increase.

The invention described and claimed in our prior application is highly effective and efficient so long as processing actually occurs. Thus, for example, in treating the ham, a processing cycle will proceed to a satisfactory conclusion providing that the brine is actually supplied to the ham and further providing that the ham retains the brine. Reliance is had upon the operator to monitor the system as far as the progress of a processing cycle is concerned. Thus if the ham happens to be a "leaker," brine will be lost so that the processing cycle may be unduly lengthened or even be prevented from terminating. The reverse condition where brine may be supplied in insufficient quantity, or may be prevented from flowing by some failure, may also occur and in such case the processing cycle will not terminate unless the operator is vigilant.

We have improved upon the invention disclosed and claimed in our prior application, and have eliminated the necessity for the operator monitoring the processing cycle. Our new and improved system makes it possible for a processing cycle to proceed in a normal manner, and likewise provides means whereby the velocity of the processing cycle may be monitored and the processing cycle may be terminated or an operator may be warned to terminate the processing cycle upon the occurrence of extreme or unusual conditions. Thus our new and improved system provides means whereby the change of weight with respect to time is utilized as a control determinant. In the event that the numerical value of this rate of weight variation becomes excessively great or excessively small, then warning or termination of processing occurs. The rate of change itself may be either positive, in which case the processing tends to increase the base weight of the material or article, or may be negative, in which case the base weight decreases during processing. The example of pickling a ham involves a processing cycle wherein there is a positive change of weight with respect to time. A process of boiling or evaporating a liquid to a predetermined percentage of its base weight involves a negative change of weight with respect to time. The invention to be hereinafter described is applicable to either type of processing.

As is disclosed in our prior application, our invention disclosed and claimed therein is based upon the fundamental fact that a total desired change of weight over a processing cycle may be considered as the integrated sum of a number of small weight differentials. Our invention disclosed and claimed in said application makes use of electric pulses generated by successive increments of additions, or subtractions as the case may be, of base weight during processing. Thus each weight increment corresponds to an electric pulse. In order to obtain a percentage variation of weight of any article being processed, as a ham, where the base weight itself may lie in a range of base weights, we have found it convenient to generate an electrical pulse for a weight increment with the value of the weight increment being proportional to the instantaneous weight of the article. This is simply a growth or increase in weight according to a logarithmic characteristic. By utilizing such a functional relationship, the same number of weight increments will always provide the same percentage change of weight at the end of a processing cycle, irrespective of the value of the base weight at the initiation of said cycle.

In one form of our invention, we provide means which may be visual or audible, whereby the frequency of such pulses may be observed. In the case of a ham, as an example, and assuming that the increase in weight with respect to time is linear, it is clear that the pulse repetition rate will be a maximum at the beginning of the processing cycle and decrease to a minimum at the termination of the processing cycle. Thus assuming a 10 pound ham, and also assuming a generally uniform brine flow into the ham, it is evident that a weight differential of 1% of the ham will be added quicker at the beginning of the pickling cycle when the ham is only 10 pounds as compared to the addition of the same 1% weight increment when the ham is say 13 pounds. The weight differential in the latter case is 30% greater than the weight differential at the beginning.

It follows, therefore, that the pulse repetition rate will vary not only with the base weight of the article as a ham, but also during the processing cycle. In one form of our invention, we provide a simple means whereby an operator can determine if processing is occurring. Within limits, an operator can learn whether the processing cycle is proceeding and at approximately what rate.

In another form of our invention, we provide means for indicating accurately any departure in either direction from normal velocity of a processing cycle and provide means whereby an operator may be alerted to an undesired condition or whereby processing may be immediately and forthwith terminated.

In general, a system embodying a simple form of our invention involves the disposition somewhere in the pulse path of the system of means such as a neon light or sound generating means responsive to the pulses. Such a system is characterized by a minimum addition of apparatus to the system disclosed and claimed in our prior application. For many purposes, such a simplified system is adequate and efficient.

Where the nature of processing demands or where conditions are such that a more automatic and more precise monitoring action is required, additional means are provided for such purposes. In addition to the pulses derived from a logarithmic relation of weight differential to base weight, we add means for generating pulses and for utilizing such pulses where the pulses have a linear relation to the weight of the article being processed. Such linearly derived pulses are utilized to indicate process velocity conditions and to monitor the process and alert an operator or terminate the process in the event that the processing velocity rises above or falls below a predetermined and desired velocity range. The monitoring system is combined with the process control system of our prior appplication in such manner that a completely effective process control system is provided to meet normal or abnormal conditions.

It is also possible to have the monitor portion of the system disclosed here as a separate system for controlling or monitoring batching systems. In such systems, predetermined weights of materials are to be successively added for compounding. Our new monitor system makes it possible to monitor a batching system to insure that the desired rate of change of weight is occurring.

For a more complete understanding of the invention reference will now be made to the drawing wherein an illustrative system embodying the invention is shown. Wide variations in the system shown and in parts of the system to meet special conditions will occur to those skilled in the art. We deem such variations to be within the scope of our invention as defined by the claims herein.

Referring now to the drawings, Figs. 1 and 2 are parts of a schematic diagram illustrating our invention.

In the system to be described, means are provided for breaking the processing cycle into two parts. In the particular example of pickling hams, it sometimes occurs that a particular ham requires the changing of the injection needle from one spot to another for proper processing. This is more fully described in our copending application previously identified. The system described in said application and also described here makes it possible to divide the processing cycle into two parts without impairing the essential continuity of the cycle.

Our application, identified above, also discloses means whereby two needles are provided together with their control valves for the purpose of readying a ham in preparation for a processing cycle while another ham is undergoing processing. It will be appreciated that, in the more general aspect of our invention whereby monitoring of a process cycle is performed, the means for controlling the processing are preferably capable of dividing the process cycle into parts or of having alternate process controls so that one processing cycle may be going on while work is being readied elsewhere for a succeeding processing cycle.

The scale means with which the processing means is associated may be of conventional character, and may have a disc or a cylinder movable over a range in substantially linear relation to the weight upon the scale. Thus referring to Fig. 1, 1 is a scale platform suitably connected to disc 3 so that the disc turns linearly with respect to the weight upon the scale platform, for example, as described in our prior application hereinbefore referred to. According to the present invention, disc 3 is provided with two concentric annular bands of alternate light-transmitting and opaque sectors. Band 3a is a logarithmic band with the angular width of the sectors logarithmically related. Beginning at one end where the width of a sector is a minimum, this corresponding to the low end of the weight range, the angular width of each sector increases logarithmically until the maximum width is reached at the end of the range of weights to be handled. It is understood that alternate light-transmitting and opaque sectors form successive sectors in this logarithmic band. Band 3a is the same as the band on the disc in our co-pending application previously referred to.

Inwardly (or outwardly) disposed of band 3a is a second band 3b of alternate light-transparent and opaque sectors. This second band of sectors is a linear band with the angular width of all the sectors the same. Thus this linear band may be a simple weight band and may even carry weight indications so that the weight on the platform may be read if desired. The linear band also covers the entire range of weights to be handled.

Cooperating with bands 3a and 3b is light source 4 and diaphragms 4a and 4b. Suitable lens systems may be provided so that two beams of light are focused upon two regions in the path of travel of the two annular bands. The transparent and opaque sectors in the two bands are adapted to control the respective light beams. Accordingly, it is necessary for each light beam, as well as each alternate light-transmitting and opaque sector, to have sufficiently good resolution to accommodate desired differential weights.

Instead of having one disc and two concentric bands, two separate discs, each carrying one of the bands, may be provided or a drum or drums may be used. A pair of photoelectric cells are provided for receiving the light beams from the respective light sources. Thus a pair of electrical pulse generators are provided. One pulse generator generates a pulse for a variable weight differential while the other pulse generator provides a pulse for a constant weight differential. As disclosed in our copending application previously referred to, other means for obtaining electric pulses corresponding to weight differentials may be provided.

Photoelectric cell 7 for cooperation with the logarithmic band and light source is connected to the input of a suitable amplifier 8. Amplifier 8 may be of the vacuum tube type or may be of the grid-controlled gaseous discharge type fed by alternating current. The latter type of amplifier permits the control grid to regain control every cycle. Thus, if a grid-controlled gas tube is fed alternating current at a suitably high frequency, such as for example, several thousand cycles per second, it is possible for such a relay to operate at high speeds. If a lower speed of operation is satisfactory, mechanical relays may be used providing that the photoelectric cell is capable of operating the same. The amplified pulses are fed to an electrical or electronic counter 10 having the characteristic of counting up to any desired number and then closing one or more circuits. Inasmuch as a predetermined number of weight increments will correspond to a predetermined percentage weight variation, it follows that a predetermined number of pulses will be generated during such weight variation. Hence whether the base weight is 8 pounds or 15 pounds or any other weight within the range of the system, a constant percentage weight increase, say 10%, will result in a constant number of pulses.

Counter 10 may, for example, be a stepping switch such as is used in automatic telephony and numerous other fields or may be of the electronic type having a number of vacuum or gas tubes connected together so that successive pulses trigger successive tubes. Such counters may be connected ringwise and may be used for high speed counting up to any desired value. An example of an electronic counter which may be used is disclosed in Patent 2,310,105 issued February 2, 1943. If a stepping switch is used, it may for example be similar to the one used in the detailed system hereinafter described, this being type SD*70 manufactured by Clare & Co. Counter 10 has suitable means for resetting to zero, this being well known in the art.

The electrical counter has full range output circuit including wire 11 going to junction 12 and has an intermediate range output circuit including wire 14 going to junction 15. It is understood that by the full range output circuit is meant a relay circuit which is closed (or opened) when the counter reaches the desired number corresponding to a full weight variation. By intermediate range output circuit is meant a relay circuit which is closed (or opened) when the counter reaches a desired intermediate number corresponding to a desired intermediate weight variation.

The counter output circuit includes common return 17. Means may be provided for varying the number to be counted either for the intermediate or full range or both and it is possible to provide for a plurality of intermediate ranges.

Junction 12 is connected by wire 20 to winding 21 of slow acting relay 22. Relay 22 is of the type having an energizing winding with means for moving one or more movable contacts, first in one direction for an energizing cycle and then in the other direction for a succeeding energizing cycle and in effect provides for a power-operated toggle switch. Thus as an example, the series S-120 ratchet relays manufactured by Guardian Manufacturing Co. has a relay of this type. Winding 21 of relay 22 has its other terminal connected by lead 23 to wire 24. Between wire 24 and common return 17 of counter 10 is any source of current, diagrammatically illustrated by a transformer winding 25. Relay 22 has movable contacts 26 and 27 which are moved from one position to another for each relay winding energizing cycle. Movable contact 26 cooperates with fixed contacts 28 and 29 while movable contact 27 cooperates with fixed contacts 30 and 31.

Contact 28 is connected by wire 33 to one terminal of the operating winding of electrically actuated valve 34. As is indicated, this valve is normally closed and may be considered as the No. 1 valve supplying needle 35. Valve 34 has an inlet connected to brine line 36. Valve 34 has its other terminal connected to common wire 38 going to the winding of valve 39 which is similar to valve 34 and controls the supply of brine to needle 40. Valve 39 has a connection by wire 42 to contact 29 of the relay 22. In practice each needle has a clamp associated with it and a shield so that the brine pressure will not force the needle out or waste brine. This is well known in the art and is not shown.

Wires 33 and 42 are connected respectively to contacts 43 and 44 of manual selector switch 46. The purpose of this selector switch is to determine whether the system will operate automatically and select first one valve and then another for use or whether each valve is to be used as desired. Contact 47 of the selector switch is connected by wire 48 to movable contact 26 of relay 22. Movable contact 50 of the selector switch is connected by wire 51 to movable contact 52 of delay relay 53. Relay 53 has winding 54 and is provided with a number of movable contacts. This relay is of the type which closes quickly but opens after a predetermined delay. As a rule, the delay in the present system may be of the order of about four or five seconds for the purpose of delaying the brine pumping portion of the cycle until the ham on the scale has been weighed and the scale is at equilibrium. Such relays are well known in the art and are provided with various means for controlling the amount of delay. Thus the delay may be provided by a synchronous timing motor, bi-metallic strip with heating element, dash pot or any other suitable means.

Winding 54 is connected by wire through a suitable source of current to start switch 55. Movable contact 56 of relay 53 cooperates with off-normal contact 57 and these two contacts are bridged across the output of amplifier 8. This can disable the counting system. Movable contact 58 of relay 53 cooperates with off-normal contact 59. Contact 59 is connected by wire 60 to the reset portion of counter 10. It is understood that this reset portion of the counter may either be a reset which returns the counter back to a starting position or which advances the counter until a predetermined starting position is reached. The other reset terminal is connected by wire 62 to movable contact 63 of relay 64 similar to relay 22. Contact 63 of relay 64 cooperates with contacts 68 and 69, the latter being dead. Contact 68 is connected by wire 70a, relay contacts to be later described and wire 70b and a suitable source of energy, as a transformer winding, back to movable contact 58 of delay relay 53.

Movable contact 52 of delay relay 53 cooperates with normal contact 71 which is connected by wire 72 to a suitable source of current to ground. Wire 72 is also connected to ground through lamp 74. Wire 72 is connected through lamp 75 to off-normal contact 76 cooperating with grounded movable contact 77 of delay relay 53. Delay relay 53 has movable contact 79 connected by wire 80 back to one terimnal of winding 65 of relay 64 and also connected to wire 24. Movable contact 79 cooperates with normal contact 82 connected to movable contact 83 of relay 53. Movable contact 79 also cooperates with off-normal contact 84 connected by wire 85 and current limiting resistor 85a to contact 86 of relay 64. Contacts 86 and 87 cooperate with movable contact 89 of relay 64. Movable contacts 63 and 89 are tied together. Thus in the position shown, movable contact 63 is on live contact 68 while movable contact 89 is on dead contact 87. Movable contact 89 is connected by wire 90 to junction 15. From junction 15 a connection is made to the movable contact of switch 92 for controlling the intermediate range action. Switch 92 has a fixed contact which is connected to junction 93 from which point wire 94 goes to the other terminal of relay winding 65.

Movable contact 83 of delay relay 53 cooperates with off-normal contact 96 connected through a suitable source of power to wire 97 going to winding 98 of relay 100. This relay is similar to relays 22 and 64. Relay winding 98 has common return 101 going to movable contact 83 and normal contact 82. Winding 98 has tap 103 going to junction 93. Connected to junction 93 and wire 94 is relay 104, whose normally closed contacts close a break in wire 105 from 12, the high side of winding 98 (this being the side having wire 97 connected thereto).

Winding 98 of relay 100 controls movable contacts 107 and 108. Contact 107 cooperates with dead contact 109 and live contact 110, while contact 108 cooperates with contacts 111 and 112. Movable contact 108 is connected by wire 108a to movable contact 50 of selector switch 46 and contact 112 is connected to grounded lamp 113. This lamp, when lit, indicates that pumping is taking place.

Movable contact 107 of relay 100 is connected by wire 115 to the common valve wire 38. Fixed contact 110 of this relay is connected by wire 116 through part 117 of an interrupt toggle switch. This interrupt switch is grounded. Part 118 of the interrupt switch is connected to control lamp 119. When the interrupt switch is operated the lamp is lit, indicating that the system is interrupted.

Lamp 122 is connected between ground and contact 111 of relay 100. Lamp 123 is connected across winding 21 of relay 22. Contacts 30 and 31 of relay 22 are connected to pump indicator lamps 124 and 125 respectively, these lamps having common wire 126 going to a source of power and connected to movable contact 130 of a second section of selector switch 46. Fixed contacts 131 and 132 are connected respectively to contacts 30 and 31 while contact 133 is connected to movable contact 27.

Interrupt switch 117 is also mechanically tied to switch 134 consisting of toggle 135 having movable contact 136 cooperating with fixed contact 137. Contact 137 is small enough so that movable contact 136 engages contact 137 for only part of its travel. Toggle 135 is actuated through lost motion means 138 having contact 139 cooperating with toggle contact 139a in one direction of toggle movement only. In the reverse direction, insulating block 139b drives the toggle without completing the circuit. Thus toggle switch 134 is momentarily closed in one direction only of actuation. The direction of closure for toggle switch 134 coincides with the direction of movement of switch 117 for closing. Switch 134 is connected across start switch 55.

Contacts 136 and 137 also control a circuit with relay 140 therein. Relay 140 has contacts 141 and 142 normally closed in circuit with wires 70a and 70b. This relay attracts its armature quickly and releases a short time after delay relay 53 releases. The purpose of this is to prevent resetting of counter 10 when resuming operation after interruption and during the delay period.

Stop switch 120 is connected between junction 12 and common return 17 of counter 10 and is provided for the purpose of stopping pumping and terminating the cycle.

Transformer primary 150 is connected through on-off switch 151 to a power line and is adapted to energize the various transformer windings.

Connected across the output of amplifier 8 are pulse indicating means 160 and 161. Pulse indicating means 160 may consist of a neon lamp and pulse indicating means 161 may consist of a speaker or other device for generating sound in response to an electrical pulse. It is understood, that the potential output of the amplifier is sufficient to cause the neon light to flash upon the occurrence of a pulse. A pulse occurs when the light is either cut-in or cut-out by a transparent or opaque sector.

The operation of that part of the system so far described will now be given.

When switch 151 is closed, the main power line is connected to primary 150 for supplying power to the various portions of the system. Lamp 74 will go on. Normally the system will be in the position shown, and assuming that the manual selector switches are in the automatic position as shown, a ham may be put on scale platform 1. Needle 35 from valve No. 1, which is the one to be operated, has been inserted into the ham in preparation for pumping. Start switch 55 is closed. When this switch is closed, the winding of relay 53 is energized and pulls up the movable contact of this relay. These contacts are in the off-normal position for the delay period and this period is long enough so that the scale will come to equilibrium. During the delay period, amplifier 8 is short-circuited by movable contact 56 closing against contact 57. At the same time, a counter reset circuit will be established running from fixed contact 59 along wire 60 through the reset portion of counter 10, wire 62, movable contact 63, fixed contact 68, wire 70a, normally closed contacts 141 and 142 of relay 140, wire 70b, movable contact 58 and fixed contact 59. Thus counter 10 will quickly assume a starting position in preparation for an operating cycle.

At the same time, contact 77 will close against contact 76 and light lamp 75 to indicate that a delay period is on. Movable contact 83 will close against fixed contact 96 to condition pump control relay 100. This circuit may be traced from movable contact 83, fixed contact 96, through a suitable source of potential to wire 97, through winding 98 back along wire 101 to movable contact 83. Relay 98 is arranged so that either portion of the winding, when energized, will actuate relay 100 and hence the relay will move contacts 107 and 108 from the positions shown to a pumping position. Considering movable contacts 107 and 108, the circuits for energizing valve No. 1 or No. 2, whichever is to be used, and pumping lamp 113 are still incomplete during the delay period because of the energization of relay 53.

Assuming now that the delay period has expired and relay 53 opens, the short-circuit for amplifier 8 will be broken. At the same time, a circuit will be established for opening the brine supply valve. Thus, beginning with movable contact 52 of relay 53 the circuit may be traced along wire 51 to movable contact 50 of the selector switch, fixed contact 47, wire 48, movable contact 26, fixed contact 28, wire 33 through No. 1 valve, common return 38, wire 115, movable contact 107, fixed contact 110, wire 116, through switch 117 to ground, from ground through the transformer winding to wire 72 and fixed contact 71. Thus brine will begin to flow and the scale 1 will move. As the ham weight increases, pulses will be generated and cause counter 10 to operate. Assuming that full range is desired, when counter 10 has reached a predetermined point corresponding to a predetermined proportional addition of weight in ham 5, a circuit within counter 10 will be established from wire 17 to wire 11 and energize winding 21 of the slow acting relay 22. This will cause movable contact 26 to change from one fixed contact to the other and prepare valve No. 2 for the next operation. At the same time, a brine cut-off circuit is established from junction 12 along wire 105 through relay winding 98, common return 101, fixed contact 82 of delay relay 53, movable contact 79, wire 80 to wire 24. This will operate fast acting relay 100 and return contacts 107 and 108 to the position shown where the valves are closed.

In case it is desired to stop, switch 120 may be closed which gives the same effect as through the counter had reached its full range. Lamp 122 will light, this circuit going from ground through lamp 122, contacts 111 and 108, wire 108a, wire 51, contacts 52 and 71 to ground. In case the system is to be interrupted, switch 117 may be opened, this breaking the circuit through either valve and causing the valve to close. Lamp 119 will be lit when switch 118 is closed. The closure of switch 117 will operate switch 134 and initiate operation of the entire system through delay relay 53. At the same time that delay relay 53 is operated, relay 140 will be energized and will quickly open the reset circuit at wires 70a and 70b. Relay 140 will keep the contacts open at least for the duration of the delay period so that no resetting can occur. After the delay period has passed, relay 140 will release and the reset circuit will return to normal.

The ham specifically shown has the principal arteries diagrammatically outlined. Thus as a rule, the femoral or external iliac artery a provides a convenient place for insertion of a brine pumping needle. Brine is forced through deep femoral branch b into one part of the ham and through the anterior femoral artery c and the popliteal artery d into the other part. Occasionally a ham is so cut as to eliminate the external iliac part of its arterial system. In such case, successive pumping of the two parts of the ham is necessary. It is understood that an even division of brine between the two parts of a ham or any other desired division therebetween may be selected with the full range in counter 10 being broken up by wire 14 going from a different tap on the counter.

If intermediate range action is desired, switch 92 is closed at any time prior to counter 10 reaching the first intermediate point. The starting action is the same and when counter 10 reaches the intermediate point, winding 65 of relay 64 is energized. This circuit may be traced from wire 14 through junction 15, switch 92, junction 93, wire 94, winding 65, wire 24, back to common return 17 and into the counter. When relay 64 is energized, movable contacts 63 and 89 are moved from the position shown in Fig. 2 to the alternate position. When movable contact 63 is on dead contact 69, the reset circuit is open, even though delay relay 53 may be closed. Thus, when pumping is resumed by closing the starter switch 55, no reset of counter 10 will occur during the delay period. When movable contact 89 closes against live contact 86, a short-circuit through relay winding 65 is provided during the delay period, when relay 53 is closed, for the remaining part of the pumping. This is desirable since the intermediate range circuit is still closed when resuming pumping. Thus, a shorting circuit for relay 65 is set up as follows: wire 94, junction 93, switch 92, junction 15, wire 90, contacts 89 and 86, wire 85, current limiting resistor 85a, contacts 84 and 79, wire 80 to the left terminal of winding 65.

During the time that counter 10 is at intermediate range, relay 104 is energized. This is fast acting and breaks the circuit for wire 105. This is desirable because the right hand part of winding 98 of relay 100 and winding 21 of relay 22 are effectively in series and may be energized. It is preferred to design these relay windings so that if in series they would not be energized very strongly and before they would have time to act upon their armatures, relay 104 would have opened this series connection.

When delay relay 53 opens in preparation for resumed pumping the short-circuit around relay winding 65 is broken. Hence, relay 64 moves back to the position shown in the drawing due to the fact that the intermediate range circuit within counter 10 is still closed. At the same time, pumping resumes due to the actuation of relay 100. This circuit may be traced from junction 93, along wire 103, through relay winding 98, return wire 101 through contacts 82 and 79 of delay relay 53, along wire 80 to wire 24 and thence through counter 10 to wire 14 and back to junction 93. When pumping resumes, the counter resumes operation and moves over the remainder of the range (thereby releasing relay 104) and the system continues to the end of its operating cycle in a normal manner. If one or more intermediate outputs for counter 10 are provided, pumping will automatically stop for each such intermediate output. The fact that the system is on intermediate range is indicated by lamp 92a being lit, this occurring whence switch 92b is closed, completing a circuit for the lamp.

The selection of the valve in the brine line for operation is indicated by lamps 124 and 125, these lamps having their circuits completed through movable contact 27 of relay 22 and movable contact 130 of the selector switch.

If it is desired to have only one of the valves operating without automatically changing from one valve to another, selector switch 46 is moved, the movable contacts 50 and 130 being moved either to the right or to the left, as desired. Thus when movable contact 50 is moved to the left, the normal circuits, previously traced for selecting a valve and controlled by the position of movable contact 26 of relay 22, are destroyed and instead a shunt from contact 50 to contact 43 is established. Similarly, if contact 50 is moved to touch contact 44, a shunt circuit for valve No. 2 is established and this valve will be energized, irrespective of the condition of relay 22. The same considerations apply to lamps 124 and 125, each of these lamps being selectively energized in the manual position of the switch.

When a ham has been pumped, lamp 123 will be energized, this lamp being connected across winding 21. When start switch 55 is closed and counter 10 is reset from a full range position, it is clear that lamp 123 will go out.

As the weight of the ham increases during pumping, flashes from neon light 160 or sound from speaker 161 will indicate to an operator that the processing is proceeding in a satisfactory manner. It is clear that the time interval between successive pulse signals will become longer as the process proceeds. Thus the operator, by watching a flashing of the lamp or listening to the speaker may obtain information as to the progress of the process cycle.

Additional means are provided for monitoring the system automatically. Referring back to photoelectric cell 7a, this is connected to amplifier 163 which may resemble amplifier 8. Amplifier 163, however, is preferably designed so that the output of the amplifier is in the form of negative pulses. Amplifier 163 has one output terminal 164 grounded. The other output terminal is connected by wire 165 to control grid 166 of a biased multivibrator, generally indicated by numeral 167. This multivibrator consists of a pair of vacuum tube amplifiers with the control grids and anodes cross-connected as shown. This particular multivibrator is of the biased type and has one of the amplifiers 170 connected somewhat differently than amplifier 171. Thus referring to amplifier 170, cathode 172 is connected to ground through bias resistor 173 and his bias resistor is shunted by condenser 174. Cathode 172 is connected through resistor 175 to a suitable source of positive potential.

This biased multivibrator normally tends to have a stable position where amplifier 170 is cut-off and amplifier 171 is conducting heavily. This stable condition is due to the bias of cathode 172 by potential-dividing resistors 175 and 173. If a negative pulse of suitable amplitude is applied to control grid 166 of amplifier 171, amplifier 171 will be cut-off and amplifier 170 will conduct. This condition, however, is unstable and after the disappearance of the pulse and the return of normal potential conditions to control grid 166, the biased multivibrator will revert to its normal condition. By a suitable choice of condensers and resistors, the action of the biased multivibrator may be made as rapid as is necessary to follow successive pulses from amplifier 163.

The condition of the biased multivibrator is visually indicated by means now to be described: Neon lamps 177 and 178 are connected from the respective anodes of amplifiers 170 and 171 to ground. It is understood that suitable resistors may be used to adjust potential conditions with relation to the lamp breakdown potential so that a neon lamp will glow when the corresponding tube is cut-off and will be dark when the corresponding tube is conducting. Thus, neon lamp 177 will normally glow, while lamp 178 will normally be dark. Connected across lamps 177 and 178 are resistors 180 and 181. These may be parts of potentiometers having wipers 182 and 183 respectively. These wipers are connected to the two terminals of a differential meter 184. By proper selection of potentials at the two potentiometers and proper adjustment of the time for return of the multivibrator from unstable to stable position, it is possible to obtain an average zero reading on the meter when the process cycle is proceeding at a predetermined normal rate. Thus as successive pulses are generated in amplifier 163, the polarity of the meter circuit will reverse and if the reversals are sufficiently rapid, the meter will remain centered. Under such conditions, amplifier 171 will have a certain average current through it and amplifier 170 will have a different average current through it. Now, if the process proceeds too slowly, it follows that the average of the current through amplifier 171 will rise. This is because the multivibrator is normally biased to have tube 171 conduct. The less frequently the multivibrator is tripped, the less frequently will tube 171 remain cut-off. Hence, lamp 178 will be, on the average, illuminated less frequently than lamp 177. Meter 184 will swing to the left.

If the process proceeds too fast, the average value of current through tube 171 will drop and the reverse will happen.

In order to provide automatic means for shutting off or interrupting the system, relay 185 is connected in series with condenser 186 across the anodes of the amplifiers for the biased multivibrator. Relay 188 is connected in series with inductance 189 across the same two anodes. By suitable choice of condenser 186, a sufficiently high repetition rate of pulses will result in enough current passing through relay 185 to operate the same. Conversely, a sufficiently slow rate of pulse repetition will permit sufficient current to flow through relay 188 to operate it.

Relays 185 and 188 each have movable contacts, normally open but movable to a closed position. Thus relay 185 has movable contact 190 cooperating with off-normal contact 191. Relay 188 has movable contact 192 cooperating with off-normal contact 193. Contacts 192 and 193 are connected together through current source 195 to movable contact 197 of switch 198. Switch 198 has fixed contact points 199 and 200 connected respectively to windings 201 and 202 of solenoids for operating the stop and interrupt switches 120 and 117 respectively. The movable contacts of relays 185 and 188 are grounded.

It is clear that closure of either relay will energize the solenoid for operating the stop or interrupt switch as desired.

The part of the system shown in Fig. 1 with only the linear band of disc 3 and its photoelectric cell and the remainder of the system may be used alone in a batch control system. In such case, the scale will turn the disc as long as the weight changes. So long as the weight variation is satisfactory, nothing happens. If the weight variation is too fast or too slow, one of the relays will operate and it may control suitable means for rendering an alarm, stopping a process cycle or accomplishing any other desired operation.

We claim:

1. A control system responsive to the weight of an article being processed during which processing the weight of said article is to be changed by a predetermined amount, said system comprising a control member movable linearly over a range in proportion to the weight of said article, said control member having a control portion divided into discrete portions with the extent of each of such divided portions being proportional to the distance from a predetermined starting point, an electric pulse generator operated by said control member for generating an electric pulse for each weight increment corresponding to a movement of said control member through one divided portion, means for initiating processing only after said control member has reached a position corresponding to the base weight of said article, means for counting pulses generated during processing, means for terminating the processing after a predetermined number of counted pulses, means responsive to said pulses for indicating a pulse repetition rate whereby said processing may be monitored as to speed with relation to a predetermined desired speed, and means for terminating said processing if the pulse repetition rate falls outside a desired range.

2. The system according to claim 1, wherein said pulse-responsive means includes means responsive to the pulse-repetition rate for indicating whether the pulses are occurring at a desired repetition rate or faster or slower than the desired rate.

3. A control system responsive to the weight of an article being processed during which the weight of said article is to be changed by a predetermined proportion of the base weight and at a predetermined rate, said system comprising a rotary control member movable linearly over a range in proportion to the weight of said article, said control member having two annular control portions, one being a logarithmic portion divided into discrete portions with the angular extent of each of such divided portions being proportional to the angular distance of a particular portion from a predetermined starting portion, the other being a linear control portion divided into discrete portions with the angular extent of each of such divided portion being uniform, an electric pulse generator for each control portion on said control member for generating pulses for logarithmic and linear weight increments respectively, an electrical counting system for receiving the logarithmically related pulses, means for feeding said logarithmically related pulses to said counting system for counting up to a predetermined number of pulses, means for preventing operation of said counting system during a preliminary delay period when said member is moving to a position of equilibrium corresponding to article weighing prior to processing, means for setting said counting system to a starting position at a time between successive complete processings, means controlled by said operation preventing means for initiating processing at the end of said delay period, means controlled by said counting system for terminating said processing after a predetermined number of means responsive to said linearly derived pulses for indicating a pulse repetition rate whereby the speed of processing may be monitored, and means for terminating said processing if the pulse repetition rate falls outside a desired range.

4. The system according to claim 3, wherein means responsive to the flow of current and the polarity of such flow are provided and wherein means are provided responsive to successive linearly derived pulses for reversing the polarity of current flow through said indicating means whereby said indicating means will show by average value of current whether the processing is proceeding at a desired rate or too slow or too fast.

5. A control system responsive to the weight of material during processing or batching at which time the weight of said material is being changed, said system comprising a control member movable over a range as a function of the instantaneous weight of said material, said control member having a control portion divided into discrete parts each discrete part corresponding to a weight increment, an electric pulse generator operated by said control member for generating an electric pulse for each weight increment corresponding to a movement of said control member through one discrete part, means responsive to said pulses for indicating a pulse repetition rate whereby said system may be monitored as to the speed or velocity with which a process or batching is occurring, and means for terminating processing if the pulse repetition rate falls outside a desired range.

6. The system according to claim 5 wherein said control member is a rotary member and has an annular control portion with the control portion divided into equal discrete parts, said discrete parts being alternately transparent and opaque and wherein said electric pulse generator includes a light source and photoelectric cell with said control portion acting as a light valve.

7. A dial member for use with a scale having a part movable linearly with respect to weight, said dial member being adapted to be rotated through an angle directly proportional to the weight on said scale, said dial member being provided with two concentric annular bands, one annular band containing logarithmically spaced graduations consisting of alternate transparent and opaque portions, the other band containing equally spaced graduations, consisting of alternate transparent and opaque portions, said two bands having alined end points with the logarithmically spaced graduations providing a proportionality factor for the linear scale at any desired portion of said two scales.

8. A platform scale having a dial member with an angular movement linearly proportional to changes in weight of an article on the platform of said scale, said dial member being provided with two annular bands, one annular band containing logarithmically spaced graduations, the other annular band containing linearly spaced graduations, said two bands having aligned end points with the logarithmically spaced graduations providing a proportionality factor for the linear scale at any desired portion of said two scales, the graduations of each band consisting of alternate transparent and opaque portions, a light source and photocell for each band whereby light beams are interrupted by graduations in the two bands on change in weight of said article to activate the photocell and thereby produce electrical responses corresponding respectively to a proportional change in base weight of the article and a linear change in weight of the article and means for utilizing said two series of responses to monitor respectively the proportional change in weight of said article and the simple change in weight in said article.

9. A method of monitoring a process during which weight changes, said method comprising generating one series of electrical pulses at a repetition rate which is non-linearly related to the weight during processing, generating a second series of pulses at a repetition rate linearly related to the weight during processing, applying a predetermined number of the non-linearly related pulses to determine a processing cycle and applying the linearly related pulses to monitor the processing as to speed, so that if the processing speed falls outside of a desired range it may be terminated.

10. The method according to claim 9 wherein said first-named series of pulses are produced at a pulse repetition rate which is logarithmically related to the weight during processing.

11. A control system responsive to the weight of an article being processed during which the weight of said article is to be changed by a predetermined proportion of the base weight and at a predetermined rate, said system comprising a rotary control member movable linearly over a range in proportion to the weight of said article, said control member having an annular logarithmic control portion divided into discrete portions with the angular extent of each of such divided portions being proportional to the angular distance of a particular portion from a predetermined starting portion, an electric pulse generator for said control portion on said control member for generating pulses for said logarithmic weight increments, an electrical counting system for receiving the pulses, means for feeding said pulses to said counting system for counting up to a predetermined number of pulses, means for preventing operation of said counting system during a preliminary delay period when said member is moving to a position of equilibrium corresponding to article weighing prior to processing, means for setting said counting system to a starting position at a time between successive complete processings, means controlled by said operation preventing means for initiating processing at the end of said delay period, means controlled by said counting system for terminating said processing after a predetermined number of counting steps, and means for transforming said pulses into a form of energy which an operator may perceive whereby the speed of processing may be monitored.

12. The system according to claim 11 wherein said transforming means comprises a gas discharge lamp which is energized by said pulses.

References Cited in the file of this patent

UNITED STATES PATENTS

| | | |
|---|---|---|
| 1,618,757 | Hoxie | Feb. 22, 1927 |
| 1,931,852 | Reichel | Oct. 24, 1933 |
| 1,948,740 | Young | Feb. 27, 1934 |
| 2,242,076 | Jones | May 13, 1941 |
| 2,266,287 | Thom | Dec. 16, 1941 |
| 2,389,113 | Reichel | Nov. 13, 1945 |
| 2,605,694 | Moss et al. | Aug. 5, 1952 |
| 2,605,695 | Campbell | Aug. 5, 1952 |
| 2,614,786 | Caron | Oct. 21, 1952 |
| 2,625,301 | Saxe | Jan. 13, 1953 |
| 2,650,790 | Carliss | Sept. 1, 1953 |
| 2,668,493 | Moss | Feb. 9, 1954 |